US012688110B2

(12) United States Patent
Sankaranarayanan

(10) Patent No.: US 12,688,110 B2
(45) Date of Patent: Jul. 21, 2026

(54) ON-DEVICE MONITORING AND ANALYSIS OF ON-DEVICE MACHINE LEARNING MODEL DRIFT

(71) Applicant: Google LLC, Mountain View, CA (US)

(72) Inventor: Hari Bhaskar Sankaranarayanan, Bengaluru (IN)

(73) Assignee: Google LLC, Mountain View, CA (US)

( * ) Notice: Subject to any disclaimer, the term of this patent is extended or adjusted under 35 U.S.C. 154(b) by 482 days.

(21) Appl. No.: 18/365,209

(22) Filed: Aug. 3, 2023

(65) Prior Publication Data

US 2025/0045184 A1    Feb. 6, 2025

(51) Int. Cl.
*G06F 11/34* (2006.01)
*H04L 67/55* (2022.01)

(52) U.S. Cl.
CPC .......... *G06F 11/3495* (2013.01); *H04L 67/55* (2022.05)

(58) Field of Classification Search
CPC .............................. G06F 11/3495; H04L 67/55
USPC .......................................................... 702/186
See application file for complete search history.

(56) References Cited

U.S. PATENT DOCUMENTS 11,755,955 B2 * 9/2023 Lange ................. G06F 11/3006
                                                        702/186
2013/0232123 A1    9/2013 Ahmed et al.

2017/0330109 A1    11/2017 Maughan et al.
2018/0262587 A1     9/2018 Berkovitz et al.
2020/0372407 A1 *  11/2020 Choi ...................... G06N 3/084

OTHER PUBLICATIONS

Amazon et al., "Resolve drift with an import operation", AWS CloudFormation, retrieved from: https://docs.aws.amazon.com/AWSCloudFormation/latest/UserGuide/resource-import-resolve-drift.html, Apr. 24, 2023, 7 pp.
Google LLC, "Monitor feature attribution skew and drift", retrieved from: https://cloud.google.com/vertex-ai/docs/model-monitoring/monitor-explainable-ai, Vertex AI, Apr. 2023, 7 pp.

(Continued)

*Primary Examiner* — John H Le
(74) *Attorney, Agent, or Firm* — Shumaker & Sieffert, P.A.

(57)                    ABSTRACT

A method includes obtaining a pre-trained machine learning model and a training embedding snapshot from a remote system, and obtaining one or more input data samples captured by a user device. The method includes, for each particular input data sample of the one or more input data samples, processing, using an on-device machine learning model corresponding to the pre-trained machine learning model, the particular input data sample to generate a corresponding on-device embedding and one or more corresponding predicted outputs, and generating, using the training embedding snapshot and the corresponding on-device embedding, corresponding performance data. The method includes aggregating the corresponding performance data for the one or more input data samples to determine one or more performance metrics for the on-device machine learning model, and transmitting the one or more performance metrics to the remote system.

20 Claims, 3 Drawing Sheets

(56) References Cited

OTHER PUBLICATIONS

Halder et al., "Radio fingerprinting for anomaly detection using federated learning in LoRa-enabled Industrial Internet of Things", retrieved from: https://www.sciencedirect.com/science/article/pii/S0167739X23000298, Jun. 2023, pp. 322-336.

Salesforce Developers, "Deploy Your Code", retrieved from: https://developer.salesforce.com/docs/commerce/pwa-kit-managed-runtime/guide/pushing-and-deploying-bundles.html, Apr. 24, 2023, 5 pp.

Microsoft et al., "Data drift (preview) will be retired, and replaced by Model Monitor", Azure Machine Learning SDK v1 for Python, Feb. 3, 2025, 22 pp.

* cited by examiner

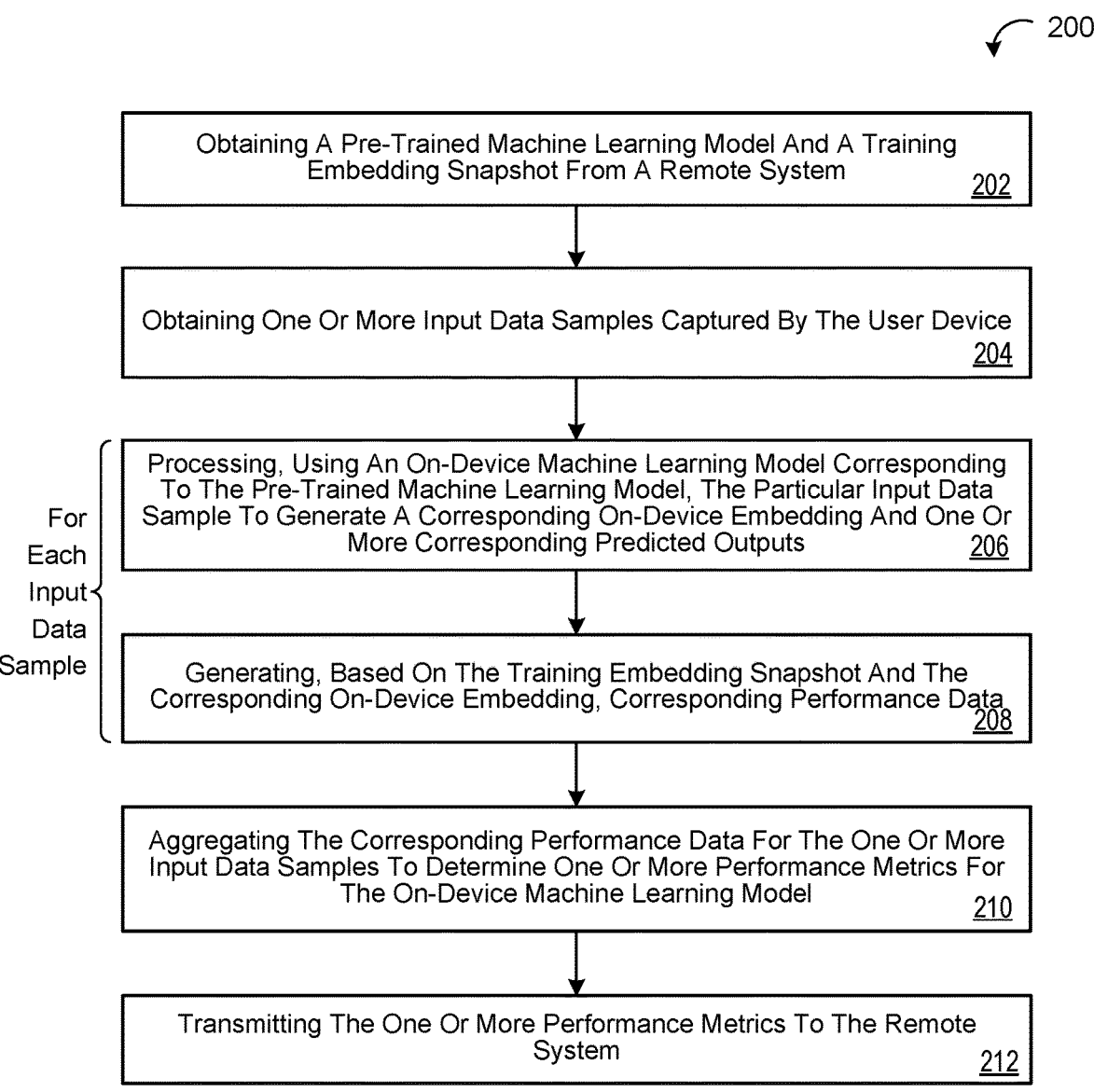

200

Obtaining A Pre-Trained Machine Learning Model And A Training Embedding Snapshot From A Remote System        202

Obtaining One Or More Input Data Samples Captured By The User Device        204

For Each Input Data Sample

Processing, Using An On-Device Machine Learning Model Corresponding To The Pre-Trained Machine Learning Model, The Particular Input Data Sample To Generate A Corresponding On-Device Embedding And One Or More Corresponding Predicted Outputs        206

Generating, Based On The Training Embedding Snapshot And The Corresponding On-Device Embedding, Corresponding Performance Data        208

Aggregating The Corresponding Performance Data For The One Or More Input Data Samples To Determine One Or More Performance Metrics For The On-Device Machine Learning Model        210

Transmitting The One Or More Performance Metrics To The Remote System        212

FIG. 2

ON-DEVICE MONITORING AND ANALYSIS OF ON-DEVICE MACHINE LEARNING MODEL DRIFT

TECHNICAL FIELD

This disclosure relates to on-device machine learning (ML) models.

BACKGROUND

Use of machine learning (ML) is increasingly common. These ML models may be configured and trained to generate any of a variety of predictions, estimations, classifications, identifications, etc. based on input data. For example, the models may be used to predict what a user spoke (i.e., a transcription) based on captured audio data representing spoken utterances of the user. In other examples, ML models are used to identify objects or persons in images, identify media content, and analyze medical images.

SUMMARY

One aspect of the disclosure provides a computer-implemented method executed on data processing hardware of a user device that causes the data processing hardware to perform operations. The operations include obtaining a pre-trained machine learning model and a training embedding snapshot from a remote system, and obtaining one or more input data samples captured by a user device. The operations including, for each particular input data sample of the one or more input data samples, processing, using an on-device machine learning model corresponding to the pre-trained machine learning model, the particular input data sample to generate a corresponding on-device embedding and one or more corresponding predicted outputs, and generating, using the training embedding snapshot and the corresponding on-device embedding, corresponding performance data. The operations include aggregating the corresponding performance data for the one or more input data samples to determine one or more performance metrics for the on-device machine learning model, and transmitting the one or more performance metrics to the remote system.

Implementations of the disclosure may include one or more of the following optional features. In some examples, the one or more performance metrics are generated without exposing content of the one or more input data samples, the corresponding on-device embeddings, or the corresponding predicted outputs to the remote system. In some implementations, the one or more performance metrics represent a drift in one or more characteristics of the input data samples over time. Additionally or alternatively, the one or more performance metrics represent a drift in the on-device machine learning model over time.

In some implementations, the operations also include receiving a trigger from the remote system, wherein generating the corresponding performance data and transmitting the one or more performance metrics to the remote system are performed in response to receiving the trigger. Here, the trigger may include a Firebase Cloud Messaging push notification. In some implementations, the trigger includes logic for generating the corresponding performance data. Additionally or alternatively, the trigger includes at least one of an indication of a time period over which corresponding performance data is to be generated, an indication of how often corresponding performance data is to be generated, or an indication of how often the corresponding performance data is to be aggregated and reported.

In some examples, generating, using the training embedding snapshot and the corresponding on-device embedding, the corresponding performance data includes determining one or more differences between the training embedding snapshot and the corresponding on-device embedding. Here the one or more differences include a cosine similarity or a Euclidean distance.

Another aspect of the disclosure provides a system including data processing hardware, and memory hardware in communication with the data processing hardware and storing instructions that, when executed on the data processing hardware, cause the data processing hardware to perform operations. The operations include obtaining a pre-trained machine learning model and a training embedding snapshot from a remote system, and obtaining one or more input data samples captured by a user device. The operations including, for each particular input data sample of the one or more input data samples, processing, using an on-device machine learning model corresponding to the pre-trained machine learning model, the particular input data sample to generate a corresponding on-device embedding and one or more corresponding predicted outputs, and generating, using the training embedding snapshot and the corresponding on-device embedding, corresponding performance data. The operations include aggregating the corresponding performance data for the one or more input data samples to determine one or more performance metrics for the on-device machine learning model, and transmitting the one or more performance metrics to the remote system.

Implementations of the disclosure may include one or more of the following optional features. In some examples, the one or more performance metrics are generated without exposing content of the one or more input data samples, the corresponding on-device embeddings, or the corresponding predicted outputs to the remote system. In some implementations, the one or more performance metrics represent a drift in one or more characteristics of the input data samples over time. Additionally or alternatively, the one or more performance metrics represent a drift in the on-device machine learning model over time.

In some implementations, the operations also include receiving a trigger from the remote system, wherein generating the corresponding performance data and transmitting the one or more performance metrics to the remote system are performed in response to receiving the trigger. Here, the trigger may include a Firebase Cloud Messaging push notification. In some implementations, the trigger includes logic for generating the corresponding performance data. Additionally or alternatively, the trigger includes at least one of an indication of a time period over which corresponding performance data is to be generated, an indication of how often corresponding performance data is to be generated, or an indication of how often the corresponding performance data is to be aggregated and reported.

In some examples, generating, using the training embedding snapshot and the corresponding on-device embedding, the corresponding performance data includes determining one or more differences between the training embedding snapshot and the corresponding on-device embedding. Here the one or more differences include a cosine similarity or a Euclidean distance.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2 is a flowchart of an example arrangement of operations for a computer-implemented method for on-device monitoring and analysis of on-device ML model drift.

Like reference symbols in the various drawings indicate like elements.

DETAILED DESCRIPTION

Traditionally, performance monitoring and analysis for a machine learning (ML) model is performed on a central server using federated analytics, which aggregates data related to use of the ML model reported by an anonymous pool of distributed user or client devices (i.e., associated with end users). A machine learning model may be analyzed to detect drift in the characteristics of input data overtime or detect drift in the parameters of the ML model. For example, an image recognition model is trained with images captured under a particular set of circumstances, but is now able to analyze images captured under different circumstances. In other examples, a text detection model is asked to recognize new characters that it was not trained to recognize, the performance of an ML model degrades over time as it is updated or personalized, etc. While a central server may use the aggregated data to detect drift for an entire group of user devices, the use of aggregated data may fail to catch drift in a small subset of the user devices. This may particularly be a problem when a user device is configured to personalize the user device's copy of the ML model based on local data captured by the user device or when a particular user starts using the ML model to analyze a different type of input data. Moreover, the amount of data that must be transmitted by a group of user devices to a central server for centralized processing may be prohibitively large, may expose private data of the group of user devices to the central server, and/or may require a large amount of computing resources at the central server. Therefore, there is a need for better drift detection methods.

Disclosed implementations perform on-device drift analysis so that micro drift patterns on specific user devices can be detected. That is, for detecting drift that is specific to a particular user device or a small subset of user devices. On-device drift analysis can take advantage of the processing capabilities of the user devices, and avoid sending potentially private data to a central server.

Figure 1:
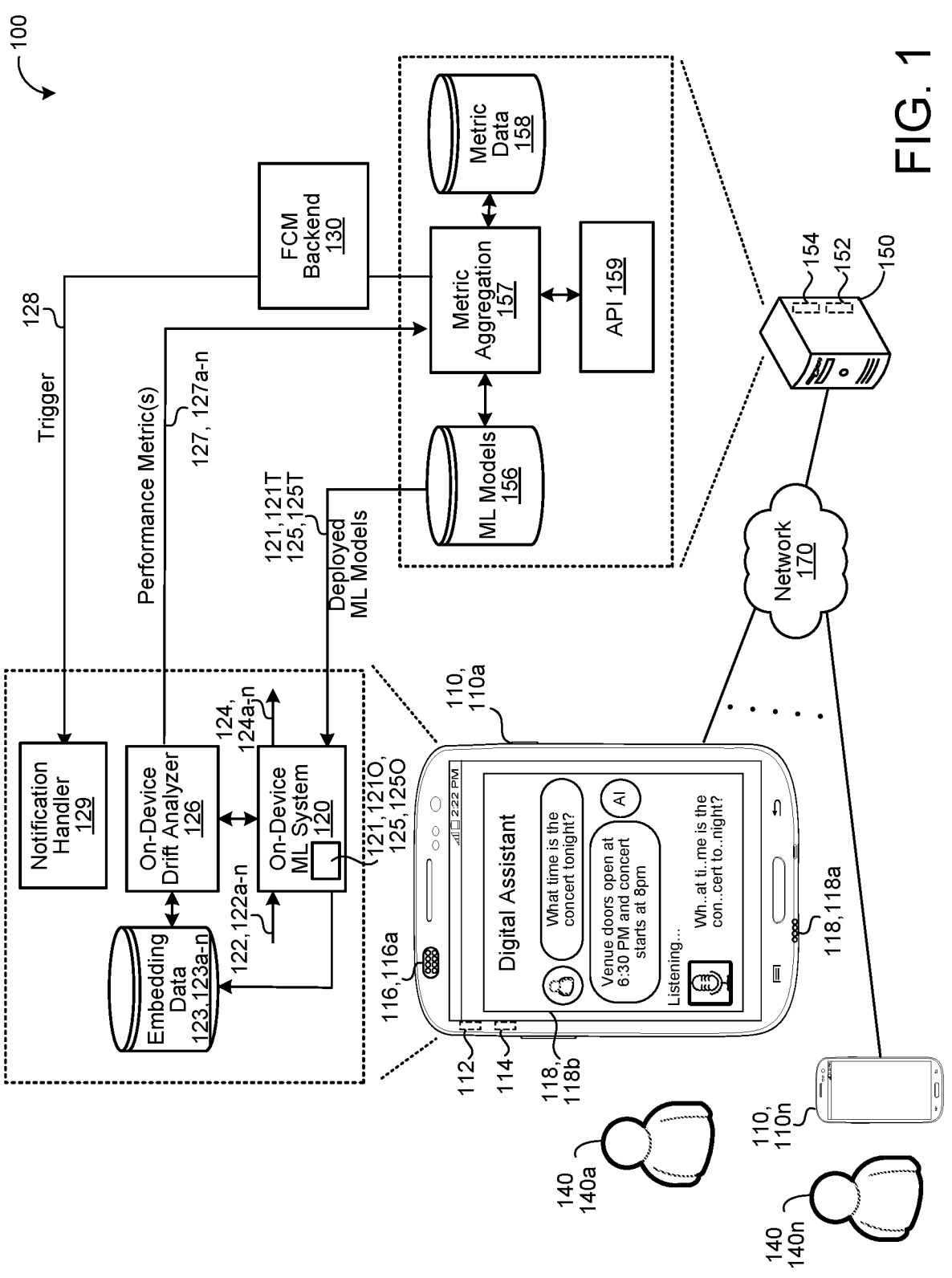
FIG. 1 depicts an example machine learning (ML) system that leverages on-device monitoring and analysis of on-device ML model drift.

FIG. 1 is a schematic view of an example machine learning (ML) system 100 configured to leverage on-device monitoring and analysis of ML model drift. Here, ML model drift refers to a drift in the characteristics of input data samples and/or drift of the ML model itself due to updating or personalization. In the example shown, the system 100 includes a remote system 150 and a plurality of client or user devices 110, 110a-n (generally referred to herein as user devices 110) each associated with a respective end user 140, 140a-n. The remote system 150 and the user devices 110 are communicatively coupled via one or more communication networks 170 (e.g., any combination of wired and/or wireless local area networks (LANs), wide area networks (WANs), cellular networks, and/or any other type(s) of network(s)).

Each user device 110 includes an on-device ML system 120 and an on-device drift analyzer 126. The on-device ML system 120 executes one or more on-device ML models 121, 121O configured to process, on the user device 110, each particular input data sample 122, 122a-n captured by the user device 110 to generate a corresponding on-device embedding 123, 123a-n of the input data sample 122 and one or more corresponding predicted outputs 124, 124a-n. Here, the on-device embeddings 123 may be computed by an encoder of an on-device ML model 121O. Each on-device ML model 121O may include a corresponding one of one or more pre-trained ML models 121, 121T deployed to the user devices 110 by the remote system 150. In the example shown, one or more of the pre-trained ML models 121T include a corresponding training embedding snapshot 125T. Here, a training embedding snapshot 125T for a particular pre-trained ML model 121T may include a statistical measure (e.g., an average, a mean, etc.) computed over the plurality of embeddings computed for a plurality of training samples during training of the pre-trained ML model 121T. The embeddings may be computed by an encoder of an ML model 121 that is being trained. Notably, when a pre-trained ML model 121T is updated and pushed to the user devices 110, the model 121T may have a different or new corresponding training embedding snapshot 125T. In some examples, the on-device ML system 120 executes the pre-trained ML model 121T and updates or personalizes the pre-trained ML model 121T to generate a corresponding on-device ML models 121O that may differ from the initial version of the pre-trained ML model 121T that was deployed to the user device 110 by the remote system 150. Therefore, an on-device ML model 121O may drift overtime.

The on-device drift analyzer 126 is configured to monitor and analyze the one or more on-device ML models 121O implemented by the on-device ML system 120 for drift in the input data samples 122 and/or in the on-device ML model(s) 121O themselves. The on-device drift analyzer 126 obtains the corresponding on-device embedding 123 computed by the on-device ML system 120 during the performance of a particular on-device ML model 120O for each particular input data sample 122 and compares the corresponding on-device embedding 123 with the training embedding snapshot 125O for the on-device ML model 121O to generate performance data. Here, the on-device drift analyzer 126 may compare the corresponding on-device embedding 123 with the training embedding snapshot 125O by determining one or more differences between the corresponding on-device embedding 123 and the training embedding snapshot 125O. Example differences include, but are not limited to, a Cosine similarity or a Euclidean distance. Notably, such differences can be computed on or by a user device 110 with low complexity. The on-device drift analyzer 126 aggregates the performance data generated for one or more input data samples 122 to determine one or more performance metrics 127, 127a-n representing drift of an on-device ML model 120O over time or drift in one or more characteristics of the input data samples 122 over time, and transmits the one or more performance metrics 127 to the remote system 150. For example, the on-device drift analyzer 126 may analyze the performance data using, for example, a sliding window to determine that differences between corresponding on-device embeddings 123 and the training embedding snapshot 125O are increasing over time. Notably, the user device 110 may generate the one or more performance metrics 127 without exposing content of the one or more input data samples 122, the corresponding on-device embeddings 123, or the one or more corresponding predicted outputs 124 to the remote system 150.

The on-device drift analyzer 126 may provide the performance metrics 127 to the remote system 150 in, for example, periodic reports or responsive to a trigger 128. Here, the trigger 128 may be sent by the remote system 150 to one or more user devices 110 to trigger them to start, end, or pause the generation and aggregation of performance metrics 127. In some examples, the trigger 128 is a push notification sent by the remote system 150 and received by a notification handler 129 of the user devices 110. Here, the push notification may be a Firebase Cloud Management (FCM) push notification sent by an FMC backend 130 on behalf of the remote system 150. In some examples, a trigger 128 includes or defines the logic or algorithm for comparing embeddings. Alternatively, a pre-trained ML model 121T may include the logic or algorithm for comparing embeddings together with the training embedding snapshot 125. In some implementations, a trigger 128 includes or defines an indication of a time period over which corresponding performance data is to be generated, the duration of a sliding time window, an indication of how often corresponding performance data is to be generated, or an indication of how often the corresponding performance data is to be aggregated and reported.

As used herein, on-device refers to a particular user device 110 executing/performing a process or function on behalf of an end user 140 of the user device 110 entirely independent of computing and storage resources implemented on a remote system 150 or any other user device 110. For example, an on-device ML model 121O refers to an ML model that is implemented by or on a user device 110. This is in contrast to the sending of input data samples 122 captured by a user device 110 to a central server (e.g., the remote system 150), which executes an ML model on behalf of the user device 110 and one or more other user devices 110, computes predicted outputs 124 for the input data samples 122 using the ML model, and returns the predicted outputs 124 to the user device 110. Similarly, on-device monitoring and analysis of drift of an on-device ML model 121O refers to monitoring and analysis of drift of an on-device ML model 121O that is performed locally by or on a user device 110. That is, the user device 110 performs the monitoring and analysis of drift of the on-device ML model 121O without sending any performance related data collected by the user device 110 to the remote system 150. In some implementations, data processing hardware 112 (e.g., a programmable processor) of a user device 110 executes instructions stored on memory hardware 114 of the user device 110 to implement the on-device ML system 120 and the on-device drift analyzer 126. Additionally or alternatively, the data processing hardware 112 may implement special purpose data hardware (e.g., a tensor processing unit (TPU)) for execution of the on-device ML models 121O on the user device 110.

The user devices 110 may correspond to any personal computing devices associated with users and capable of receiving inputs, processing, and providing outputs. Some examples of user devices 110 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. Each user device 110 includes data processing hardware 112, and memory hardware 114 in communication with the data processing hardware 112. The memory hardware 114 stores instructions that, when executed by the data processing hardware 112, cause the data processing hardware 112 or, more generally, the user device 110, to perform one or more operations. Each user device 110 includes, or may be coupled to, one or more input systems 116 (e.g., an audio capture device such as a microphone 116a, a virtual keyword, a keyboard, etc.) to capture, record, receive, or otherwise obtain, input data samples 122 representing user inputs (e.g., spoken utterances) for the user device 110. Each user device 110 also includes, or may be coupled to, one or more output systems 118 (e.g., a speaker 118a, a screen 118b, etc.) to output or otherwise provide outputs of the user device 110 (e.g., predicted outputs 124) to a user 140. The input system(s) 116 may also be used to obtain input data samples 122 from other users 140, devices, systems, etc. The output system(s) 118 may also be used to provide outputs to other users 140, devices, systems, etc.

The on-device ML system 120 may implement any number and variety of on-device ML models 121O. For example, the on-device ML system 120 may implement, without limit, an automatic speech recognition (ASR) model, a natural language processing (NLP) model, a text-to-speech (TTS) model, an image recognition ML model, a classification ML model, a medical diagnostic ML model, an object identification ML model, a person identification ML model, a speaker identification ML model, a media content identification ML model, a speech-to-speech model, a language model, a language translation model, a machine translation model, or any other type of ML model that is trained via ML to generate predicted outputs based on received inputs.

The remote system 150 includes data processing hardware 152, and memory hardware 154 in communication with the data processing hardware 152. The memory hardware 154 stores instructions that, when executed by the data processing hardware 152, cause the data processing hardware 152 to perform one or more operations, such as those disclosed herein. In some examples, the remote system 150 is provided by an ML model developer. Alternatively, the remote system 150 is a central server that trains and deploys pre-trained ML models 121T and obtains the performance metrics 127 from user devices 110 executing the deployed pre-trained ML models 121T on behalf of a plurality of different ML model developers.

The example remote system 150 includes an ML model datastore 156 for storing the pre-trained ML models 121T deployed by the remote system 150 to the user devices 110. In some examples, the training embedding snapshots 125 are stored together with their respective pre-trained ML models 121T in the ML model datastore 156.

In the example shown, the remote system 150 includes a metric aggregator 157 for receiving or obtaining the performance metrics 127 from the user devices 110, and storing the performance metrics 127 in a metric data datastore 158. In some implementations, the metric aggregator 157 populates a database stored on the datastore 158 to track how particular ML features are drifting on various user devices 110 over time. In some examples, the metric aggregator 157 aggregates the performance metrics 127 received from various user devices 110 to determine the drift performance for a population of user devices 110 as a whole. Additionally or alternatively, the metric aggregator 157 uses the performance metrics 127 for a particular user device 110 to track the drift of a particular ML feature on that particular user device 110. In some examples, when performance metrics 127 are degraded for a particular user device 110 (e.g., by more than a threshold amount of drift detected), the metric aggregator 157 receives the performance metrics 127 from the particular user device 110 via a debug log or bug report such that the metric aggregator 157 is made aware that an on-device ML model implemented by the particular user device 110 is not be performing as expected by the ML developer for the ML model.

The remote system 150 includes an application programming interface (API) 159 or other user interface for enabling an ML model developer to provide a pre-trained ML model 121T that is to be deployed by the remote system 150 to the user devices 110 along with a corresponding training embedding snapshot 125T for the pre-trained ML model 121T that will also be provided to the user devices 110.

FIG. 2 is a flowchart of an exemplary arrangement of operations for a computer-implemented method 200 executed by a user device 110 for on-device monitoring and analysis of drift of on-device ML models 121O. The operations may be performed by data processing hardware 310 (see FIG. 3), e.g., the data processing hardware 112 of the user device 110, based on executing instructions stored on memory hardware 320, e.g., the memory hardware 114 of the user device 110.

At operation 202, the method 200 includes obtaining a pre-trained machine learning model 121T and a training embedding snapshot 125T from a remote system 150. At operation 204, the method 200 includes obtaining one or more input data samples 122 captured by the user device 110.

The method 200 includes, for each particular input data sample 122 of the one or more input data samples 122, processing, using an on-device machine learning model 121O corresponding to the pre-trained machine learning model 121T, the particular input data sample 122 to generate a corresponding on-device embedding 123 and one or more corresponding predicted outputs 124 (operation 206), and generating, based on the training embedding snapshot 125T and the corresponding on-device embedding 123, corresponding performance data (operation 208).

The method 200 includes, at operation 210, aggregating the corresponding performance data for the one or more input data samples 122 to determine one or more performance metrics 127 for the on-device machine learning model 121O. At operation 212, the method 200 includes transmitting the one or more performance metrics 127 to the remote system 150.

Figure 3:
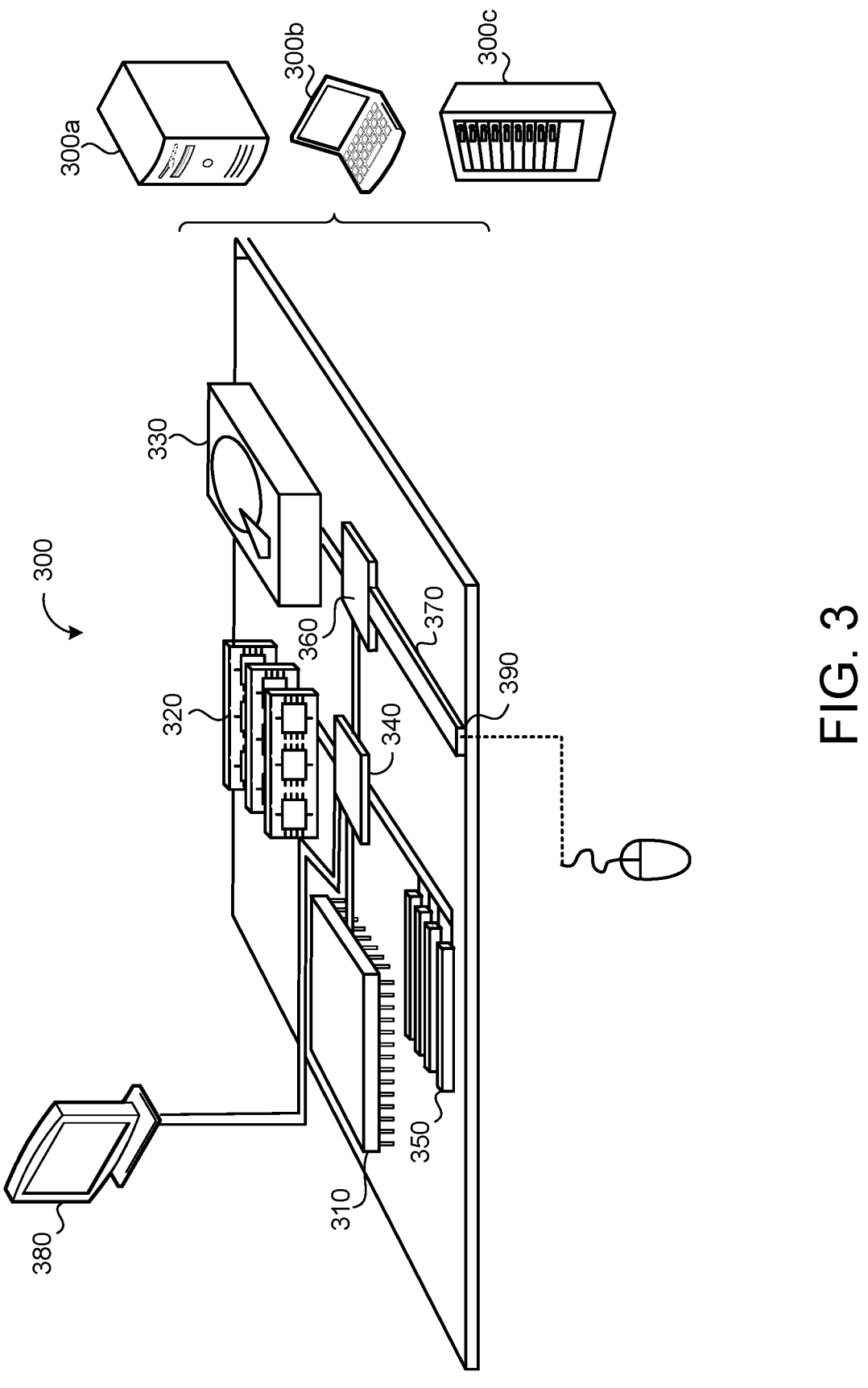
FIG. 3 is a schematic view of an example computing device that may be used to implement the systems and methods described herein.

FIG. 3 is a schematic view of an example computing device 300 that may be used to implement the systems and methods described in this document. The computing device 300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 300 includes a processor 310 (i.e., data processing hardware) that can be used to implement the data processing hardware 112 and/or 152, memory 320 (i.e., memory hardware) that can be used to implement the memory hardware 114 and/or 154, a storage device 330 (i.e., memory hardware) that can be used to implement the memory hardware 114 and/or 154, a high-speed interface/ controller 340 connecting to the memory 320 and high-speed expansion ports 350, and a low speed interface/ controller 360 connecting to a low speed bus 370 and a storage device 330. Each of the components 310, 320, 330, 340, 350, and 360, are interconnected using various busses, and may be mounted on a common motherboard or in other manners as appropriate. The processor 310 can process instructions for execution within the computing device 300, including instructions stored in the memory 320 or on the storage device 330 to display graphical information for a graphical user interface (GUI) on an external input/output device, such as display 380 coupled to high speed interface 340. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 320 stores information non-transitorily within the computing device 300. The memory 320 may be a computer-readable medium, a volatile memory unit(s), or non-volatile memory unit(s). The non-transitory memory 320 may be physical devices used to store programs (e.g., sequences of instructions) or data (e.g., program state information) on a temporary or permanent basis for use by the computing device 300. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 330 is capable of providing mass storage for the computing device 300. In some implementations, the storage device 330 is a computer-readable medium. In various different implementations, the storage device 330 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 320, the storage device 330, or memory on processor 310.

The high speed controller 340 manages bandwidth-intensive operations for the computing device 300, while the low speed controller 360 manages lower bandwidth-intensive operations. Such allocation of duties is exemplary only. In some implementations, the high-speed controller 340 is coupled to the memory 320, the display 380 (e.g., through a graphics processor or accelerator), and to the high-speed expansion ports 350, which may accept various expansion cards (not shown). In some implementations, the low-speed controller 360 is coupled to the storage device 330 and a low-speed expansion port 390. The low-speed expansion port 390, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 300a or multiple times in a group of such servers 300a, as a laptop computer 300b, or as part of a rack server system 300c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A method comprising:

obtaining, by data processing hardware of a user device, a pre-trained machine learning model and a training embedding snapshot from a remote system;

obtaining, by the data processing hardware, one or more input data samples captured by the user device;

for each particular input data sample of the one or more input data samples:

processing, by the data processing hardware and using an on-device machine learning model corresponding to the pre-trained machine learning model, the particular input data sample to generate a corresponding on-device embedding and one or more corresponding predicted outputs; and generating, by the data processing hardware and based on the training embedding snapshot and the corresponding on-device embedding, corresponding performance data;

aggregating, by the data processing hardware, the corresponding performance data for the one or more input data samples to determine one or more performance metrics for the on-device machine learning model; and causing the remote system to analyze a performance of the on-device machine learning model by, at least, transmitting, by the data processing hardware, the one or more performance metrics to the remote system without transmitting the one or more input data samples to the remote system.

2. The method of claim 1, wherein the one or more performance metrics are generated without exposing content of the corresponding on-device embeddings or the corresponding predicted outputs to the remote system.

3. The method of claim 1, wherein the one or more performance metrics represent a drift in one or more characteristics of the one or more input data samples over time.

4. The method of claim 1, wherein the one or more performance metrics represent a drift in the on-device machine learning model over time.

5. The method of claim 1, further comprising: receiving, by the data processing hardware, a trigger from the remote system, wherein generating the corresponding performance data and transmitting the one or more performance metrics to the remote system are performed in response to receiving the trigger.

6. The method of claim 5, wherein the trigger comprises a cloud messaging push notification.

7. The method of claim 5, wherein the trigger comprises logic for generating the corresponding performance data.

8. The method of claim 5, wherein the trigger comprises at least one of an indication of a time period over which the corresponding performance data is to be generated, an indication of how often the corresponding performance data is to be generated, or an indication of how often the corresponding performance data is to be aggregated and reported.

9. The method of claim 1, wherein generating, based on the training embedding snapshot and the corresponding on-device embedding, the corresponding performance data comprises determining one or more differences between the training embedding snapshot and the corresponding on-device embedding.

10. The method of claim 9, wherein the one or more differences comprise a cosine similarity or a Euclidean distance.

11. A system comprising:

data processing hardware of a user device; and memory hardware in communication with the data processing hardware and storing instructions that when executed on the data processing hardware cause the data processing hardware to:

obtain a pre-trained machine learning model and a training embedding snapshot from a remote system;

obtain one or more input data samples captured by the user device;

for each particular input data sample of the one or more input data samples:

process, using an on-device machine learning model corresponding to the pre-trained machine learning model, the particular input data sample to generate a corresponding on-device embedding and one or more corresponding predicted outputs; and generate, using the training embedding snapshot and the corresponding on-device embedding, corresponding performance data;

aggregate the corresponding performance data for the one or more input data samples to determine one or more performance metrics for the on-device machine learning model; and cause the remote system to analyze a performance of the on-device machine learning model by, at least, transmitting the one or more performance metrics to the remote system without transmitting the one or more input data samples to the remote system.

12. The system of claim 11, wherein the one or more performance metrics are generated without exposing content of the corresponding on-device embeddings or the corresponding predicted outputs to the remote system.

13. The system of claim 11, wherein the one or more performance metrics represent a drift in one or more characteristics of the one or more input data samples over time.

14. The system of claim 11, wherein the one or more performance metrics represent a drift in the on-device machine learning model over time.

15. The system of claim 11, wherein the instructions further cause the data processing hardware to receive a trigger from the remote system, wherein the instructions cause the data processing hardware to generate the corresponding performance data and transmit the one or more performance metrics to the remote system in response to receiving the trigger.

16. The system of claim 15, wherein the trigger comprises a cloud messaging push notification.

17. The system of claim 15, wherein the trigger comprises logic for generating the corresponding performance data.

18. The system of claim 15, wherein the trigger comprises at least one of an indication of a time period over which the corresponding performance data is to be generated, an indication of how often the corresponding performance data is to be generated, or an indication of how often the corresponding performance data is to be aggregated and reported.

19. The system of claim 11, wherein, to generate, using the training embedding snapshot and the corresponding on-device embedding, the corresponding performance data, the instructions cause the data processing hardware to determine one or more differences between the training embedding snapshot and the corresponding on-device embedding.

20. The system of claim 19, wherein the one or more differences comprise a cosine similarity or a Euclidean distance.

* * * * *